United States Defensive Publication [19] (H) [11] T100,504

Sublett [43] Apr. 7, 1981

[54] COPOLYESTER HOT-MELT ADHESIVES

[76] Inventor: Bobby J. Sublett, 1205 Jerry La., Kingsport, Tenn. 37664

[21] Appl. No.: 136,143

[22] Filed: Mar. 31, 1980

[51] Int. Cl.[3] ..... C08G 63/16

[52] U.S. Cl. ..... 528/302

[57] ABSTRACT

Copolyesters useful as low melting fusible interlining adhesives derived from (1) terephthalic acid, (2) succinic or glutaric acid, (3) ethylene glycol and (4) 1,6-hexanediol or derivatives of these components.

2 Claims, No Sheets Drawing,

12 Pages Specification

The file of this unexamined application may be inspected and copies thereof may be purchased (849 O.G. 1221, Apr. 9, 1968).